United States Patent [19]

Mills et al.

[11] 4,155,372

[45] May 22, 1979

[54] PORTABLE SIPHON APPARATUS FOR REMOVING CONCENTRATIONS OF LIQUID FROM A GAS PIPELINE

[75] Inventors: Walter C. Mills; James W. Patterson, both of San Angelo, Tex.

[73] Assignee: Northern Natural Gas Company, Omaha, Nebr.

[21] Appl. No.: 832,673

[22] Filed: Sep. 12, 1977

[51] Int. Cl.² ............................................. F17d 1/00
[52] U.S. Cl. ........................................ 137/1; 137/152; 137/317; 138/178
[58] Field of Search .................. 137/317, 318, 1, 123, 137/152; 138/37, 178; 141/65

[56] References Cited

U.S. PATENT DOCUMENTS

| | | | |
|---|---|---|---|
| 1,181,910 | 5/1916 | McGilvray | 137/317 |
| 1,317,324 | 9/1919 | Scoville | 137/152 |
| 1,573,291 | 2/1926 | Bianchi | 137/152 |
| 1,953,525 | 4/1934 | Young | 138/178 |
| 2,073,311 | 3/1937 | May | 137/318 |
| 2,617,205 | 11/1952 | Cram | 137/152 |
| 3,270,677 | 9/1966 | Eller et al. | 138/37 |
| 3,920,037 | 11/1975 | Hoff et al. | 137/318 |
| 3,948,283 | 4/1976 | Asfura et al. | 137/152 |

FOREIGN PATENT DOCUMENTS 2541 of 1889 United Kingdom .................. 137/317

Primary Examiner—William R. Cline
Assistant Examiner—G. L. Walton
Attorney, Agent, or Firm—Zarley, McKee, Thomte, Voorhees & Sease

[57] ABSTRACT

An apparatus for removing concentrations of liquid from a natural gas pipeline comprising a tap valve mounted on the pipeline at the upper portion thereof so as to be in communication with the interior of the pipeline. A siphon apparatus is removably mounted on the tap valve and includes a siphon pipe which is vertically movably mounted with respect to the tap valve. The siphon pipe is vertically movable from an upper position wherein the lower end of the siphon pipe is positioned above the tap valve to a lower position wherein the siphon pipe extends through the tap valve so that the lower end of the siphon pipe is positioned at the bottom interior of the pipeline. A discharge pipe extends from the siphon pipe and is in communication with a liquid holding tank. A siphon valve is imposed in the discharge pipe to permit the selective removal of the liquid from the pipeline.

7 Claims, 5 Drawing Figures

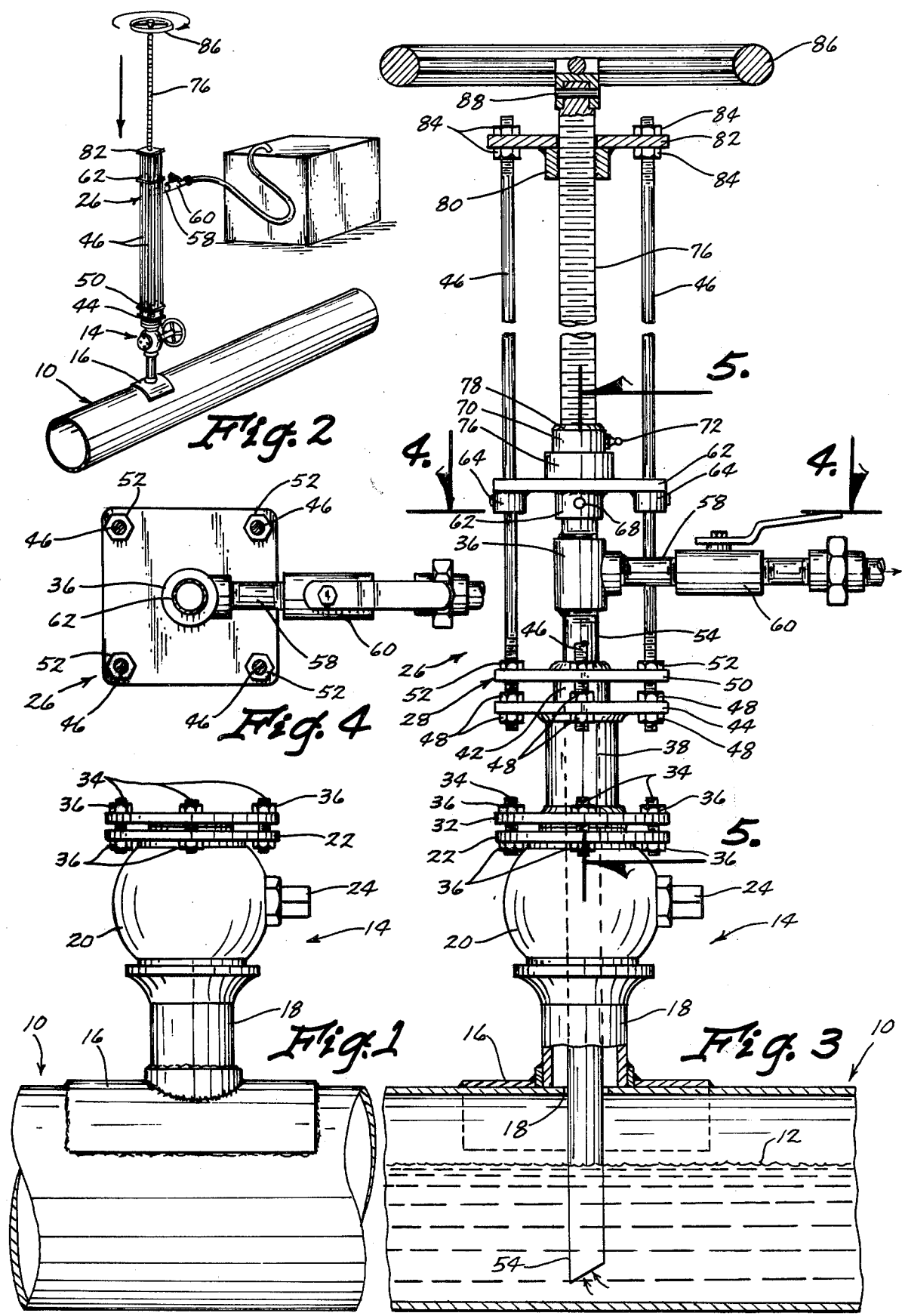

PORTABLE SIPHON APPARATUS FOR REMOVING CONCENTRATIONS OF LIQUID FROM A GAS PIPELINE

BACKGROUND OF THE INVENTION

This invention relates to a portable siphon apparatus which may be used to remove concentrations of liquid from a natural gas pipeline.

A problem encountered in the transportation of natural gas through gathering and carrier pipelines is that liquid tends to concentrate in the "low spots" or sags in the pipeline. Collection of liquids in gathering system pipelines has always been a problem. In recent years it has become progressively worse since greater production demands and declining reservoir pressure have caused the producing formations to yield water at an ever increasing rate. Liquid removal equipment at well heads may not exist, or if it does, it may become overloaded or fail to operate properly. Liquids are carried into the pipeline system where it condenses and separates from the natural gas stream and collects in the low places between hills, at stream undercrossings, or where the pipeline is buried deep in order to cross highways or railroads.

Liquid concentrations in gathering systems seriously restricts the flow of gases and causes back pressures to be built against the feeding wells with consequent loss of well production. Liquid concentrations affect gathering compressors thereby causing waste of fuel and horsepower. Liquids moving through gas compressors cause excessive wear thereby increasing down time and maintaincost. During winter months when production is ordinarily most needed, the pipeline may freeze off completely and production from an entire subsystem may be lost. Such pipeline freezes are extremely difficult to locate and clear and usually happen at a time when weather and work conditions are less than desirable.

In the past, to clear a section of pipeline of liquid, blowdowns on either end of a section were opened and the line was blown long and hard to the atmosphere. Large volumes of gas were wasted in addition to salt water and petroleum liquids being blown onto the land.

Therefore, it is a principal object of the invention to provide an improved apparatus for removing liquids from natural gas pipelines.

A still further object of the invention is to provide a portable siphon apparatus which may be used in combination with valves mounted at low spots or sags in the pipeline to remove liquids from the pipeline.

A still further object of the invention is to provide a portable siphon apparatus for removing liquids from pipelines which does not require that the line be taken out of service.

A still further object of the invention is to provide a portable siphon apparatus which may be used to remove liquids from pipelines wherein the liquids are not blown into the atmosphere.

A still further object of the invention is to provide a portable siphon apparatus for removing liquids from natural gas pipelines without undesirable gas loss.

A still further object of the invention is to provide a siphon apparatus for removing liquids from natural gas pipelines which is economical of manufacture and durable in use.

BRIEF DESCRIPTION OF THE DRAWINGS

FIG. 1 is a side view of the pipeline and valve mounted thereon after the siphon apparatus has been removed therefrom.

FIG. 2 is a perspective view of the apparatus of this invention installed on a pipeline.

FIG. 3 is a sectional view similar to FIG. 2 except that the siphon pipe is illustrated in its lowered position.

FIG. 4 is a sectional view as seen on lines 4—4 of FIG. 3.

SUMMARY OF THE INVENTION

Figure 5:
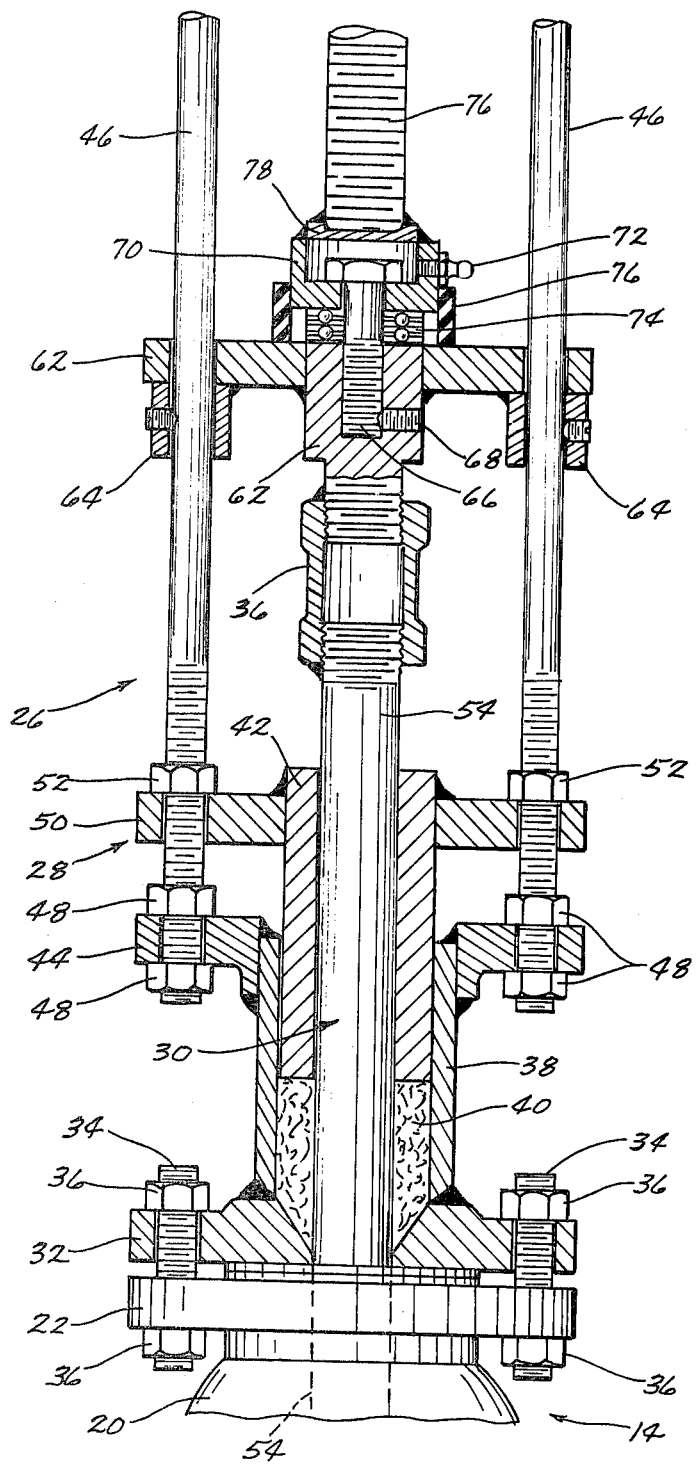

A full opening tap valve is welded to the pipeline at each low spot or sag wherein concentrations of liquids occur. A portable siphon apparatus is removably secured to the upper end of the valve and includes a siphon pipe which is vertically movably mounted with respect to the valve. The siphon pipe is movable from a first position wherein the lower end thereof is positioned above the valve to a lower position wherein the siphon pipe extends downwardly through the valve so that the lower end thereof is in communication with the bottom interior of the pipeline. A discharge pipe extends from the upper end of the siphon pipe to a liquid holding tank so that the liquid removed from the pipeline will be discharged into the holding tank upon the opening of a siphon valve in the discharge pipe.

DESCRIPTION OF THE PREFERRED EMBODIMENT

The numeral 10 refers generally to a natural gas carrier pipeline having liquid 12 which tends to concentrate in the low spots or sags in the pipeline. The presence of the liquid 12 in the pipeline restricts the flow of natural gas through the pipeline. The liquid 12 will also freeze during cold temperatures which can completely freeze off the pipeline.

As stated, liquid inside a pipeline collects at low places. Pressure profiles taken during normal operating conditions will indicate the presence of liquid in the low places. The gas does not flow with sufficient velocity to carry the liquid over the top of hills or the like and must therefore pass through the liquid in the form of bubbles. After the pipeline has been excavated at the lowest point in a valley, the gas bubbles traveling through the liquid are audible and are detected with an electronic listening device such as a "Sonotec" instrument. At the lowest point in the valley, the pipeline is first excavated and a full-opening tap valve assembly 14 is installed on the pipeline in conventional fashion. As seen in the drawings, a reinforcing pad 16 is saddle welded to the pipeline so as to extend around the opening 18 which is formed in the pipeline 10 in conventional fashion using conventional tapping equipment. Nipple 18 is welded to pad 16 and extends upwardly therefrom. A full-opening tap valve 20 is welded to nipple 18 and is provided with a flange 22 at its upper end. The operation of the valve 20 is controlled by means of the stem portion 24 extending laterally therefrom. After the tap opening 19 has been formed in the pipe, the tap equipment is removed therefrom.

When it is desired to remove the liquid 12 from the pipeline 10, the siphon apparatus 26 is removably secured to the valve assembly 14 as well be described in more detail hereinafter. Siphon apparatus generally comprises a support means 28 having a siphon pipe 30 vertically movably mounted thereon. More particularly, support means 28 comprises a blind flange 32 which is bored and tapered and which is secured to flange 22 by a plurality of bolts 34 and nuts 36 in the manner illustrated in FIG. 2. Packing case or nipple 38 is welded to flange 32 and extends upwardly therefrom. The numeral 40 refers to a packing gland within nipple 38 which is positioned at the lower end of a packing follower sleeve 42 positioned in nipple 6. Flange 44 is welded to the upper end of case 38 and has four guide bolts 46 secured thereto by nuts 48 as illustrated in the drawings. Guide bolts 46 extend upwardly from flange 44 through flange 50 which is welded to the upper end of the packing follower sleeve 50. Nuts 52 are threadably mounted on guide bolts 46 above flange 50 for maintaining the flange 50 and sleeve 42 in position so that the lower end of the sleeve 42 will be maintained in engagement with the packing gland 40. Siphon pipe 54 is vertically movably received by the sleeve 42 and extends downwardly through valve 20, when valve 20 is open, so that the lower end thereof is received by the pipeline 10. A T-fitting 56 is secured to the upper end of pipe 54 and has discharge pipe 58 extending laterally therefrom. Discharge pipe 58 extends to a liquid holding tank and has a full opening ball valve 60 enclosed therein. Plug 62 is secured to the upper end of T-fitting 56 and has flange 62 welded thereto which is vertically movably mounted on the guide bolts 46. Adjustable stops 64 are mounted on the guide bolts 46 to limit downward movement of the flange 17 and hence the siphon pipe 54 to prevent the pipe 54 from engaging the pipeline.

Capscrew 66 is mounted in the upper end of plug 62 and is held therein by set screw 68. Cap 70 is rotatably mounted on capscrew 66 as illustrated in the drawings and has a grease zerk fitting 72 provided thereon to enable grease to be inserted into the interior of the cap 70. The numeral 74 refers to a double race thrust bearing which is positioned between the lower end of the cap 70 and the upper end of flange 62. A grease retainer 76 in the form of a rubber boot embraces cap 70 and extends around the bearing 74 as illustrated.

Feed screw 76 is welded to disc 78 which is welded to the upper end of cap 70. Feed screw 76 extends upwardly through a feed screw nut 80 which is welded to the underside of flange 82 secured to the upper ends of guide bolts 46 by nuts 84. Screw handle 86 is secured to the upper end of screw 76 by pen 88.

In operation, the tap-valve assembly 14 is preferably mounted on the pipeline 10 at each sag or low spot previously described with the valve 20 being normally closed. When it is desired to remove the liquid from the pipeline 10, the flange closing the upper end of the valve 20 is removed and the siphon apparatus 26 is mounted thereon by means of the bolts 34 and nuts 36. Prior to mounting the siphon apparatus 26 on the valve assembly 14, screw 76 is rotated to move flange 62 upwardly towards the upper ends of the guide bolts 46 so that the lower end of the siphon pipe 54 is positioned above valve 20 with sufficient clearance to allow valve 20 to be closed. Valve 60 is initially closed as the siphon apparatus 26 is secured to the valve assembly 14. After the siphon apparatus 26 has been secured to the valve assembly 14 and the discharge pipe 58 has been placed in communication with the holding tank, the valve 20 is opened and screw 76 is rotated by means of handle 86 so that siphon pipe 54 moves downwardly through the valve 20 and into the interior of the pipeline 10 as illustrated. Preferably, the lower end of the siphon pipe 54 is beveled or tapered as illustrated. Also, it is recommended that the minimum of one-half inch clearance be maintained between the lower end of the siphon pipe and the bottom of the pipeline.

From the description herein, it can be seen that pipe 54 does not rotate as it is being lowered into the pipeline due to the rotatable connection being provided between the screw 76 and the plug 62. Upon the siphon pipe 54 being lowered to the proper position, valve 60 is then opened so that the pressure within the pipeline 10 causes the liquid 12 to be forced upwardly through the siphon 54 and outwardly through the discharge pipe 58 to the holding tank. When the liquid has been blown from the pipeline 10, valve 60 is closed and the siphon pipe 54 is raised by means of the screw 76 until the lower end of the siphon pipe is again positioned above valve 20 with sufficient clearance to allow valve 20 to be closed. Valve 20 is then closed and valve 60 opened to relieve pressure. The siphon apparatus 26 is then removed from the valve assembly 14. The siphon apparatus 26 may then be taken to the next location requiring the removal of liquids from the pipeline.

Thus it can be seen that a novel portable siphon has been provided which permits the removal of liquid from a pipeline without the necessity of taking the line out of production. Additionally, it can be seen that a novel siphon apparatus has been provided which is safe to use under high pressure conditions and which prevents the liquid from being blown into the atmosphere. Thus it can be seen that the invention accomplishes at least all of the stated objectives.

I claim:

1. An apparatus for removing concentrations of liquid from a natural gas carrier pipeline, comprising,
   a first valve means mounted on the pipeline at the upper portion thereof and being in communication with the interior thereof,
   a siphon means mounted on said first valve means comprising a support means secured to the first valve means and extending upwardly therefrom; a siphon pipe vertically movably mounted on said support means, said siphon pipe being movable from an upper position, wherein the lower end thereof is disposed above said first valve means, to a lower position wherein said siphon pipe extends through said first valve means with the lower end of said siphon pipe being positioned in said pipeline,
   means for moving said siphon pipe between said upper and lower positions,
   a second valve means operatively fluidly connected to said siphon pipe above said first valve means for permitting the selective removal of the liquid in said pipeline upwardly through said siphon pipe,
   said support means comprising a plurality of spaced apart upstanding guide members having a support member secured thereto adjacent the upper ends thereof,
   said means for moving said siphon pipe comprising an elongated threaded member threadably mounted in said support member and extending downwardly therefrom, a support plate means vertically movably mounted on said guide members, the lower end of said elongated threaded member being rotatably secured to said support plate means, the upper end of said siphon pipe being secured to said support plate means and extending downwardly therefrom.

2. The apparatus of claim 1 wherein a packing gland means embraces said siphon pipe above said first valve means.

3. The apparatus of claim 1 wherein a stop means is secured to said guide members for limiting the downward movement of said support plate means and said siphon pipe.

4. In combination with a natural gas carrier pipeline having
 a first valve means mounted on the pipeline at the upper portion thereof and being in communication with the interior thereof,
 an apparatus for removing concentrations of liquid from the pipeline comprising a siphon means mounted on said first valve means comprising a support means secured to the first valve means and extending upwardly therefrom; a siphon pipe vertically movably mounted on said support means, said siphon pipe being movable from an upper position, wherein the lower end thereof is disposed above said first valve means, to a lower position wherein said siphon pipe extends through said first valve means with the lower end of said siphon pipe being positioned in said pipeline,
 means for moving said siphon pipe between said upper and lower positions,
 a second valve means operatively fluidly connected to said siphon pipe above said first valve means for permitting the selective removal of the liquid in said pipeline upwardly through said siphon pipe,
 said support means comprising a plurality of spaced apart upstanding guide members having a support member secured thereto adjacent the upper ends thereof,
 said means for moving said siphon pipe comprising an elongated threaded member threadably mounted in said support member and extending downwardly therefrom, a support plate means vertically movably mounted on said guide members, the lower end of said elongated threaded member being rotatably secured to said support plate means, the upper end of said siphon pipe being secured to said support plate means and extending downwardly therefrom.

5. An apparatus for removing concentrations of liquid from a natural gas carrier pipeline, comprising,
 a first valve means mounted on the pipeline at the upper portion thereof and being in communication with the interior thereof,
 a siphon means mounted on said first valve means comprising a support means secured to the first valve means and extending upwardly therefrom; a siphon pipe vertically movably mounted on said support means, said siphon pipe being movable from an upper position, wherein the lower end thereof is disposed above said first valve means, to a lower position wherein said siphon pipe extends through said first valve means with the lower end of said siphon pipe being positioned in said pipeline,
 means for moving said siphon pipe between said upper and lower positions,
 a second valve means operatively fluidly connected to said siphon pipe above said first valve means for permitting the selective removal of the liquid in said pipeline upwardly through said siphon pipe,
 said support means comprising a support member operatively secured to said first valve means and positioned thereabove, an elongated threaded member threadably mounted in said support member and extending downwardly therefrom, the lower end of said threaded member being operatively secured to said siphon pipe whereby rotation of said threaded member with respect to said support member causes vertical movement of said siphon pipe between said upper and lower positions.

6. The method of removing concentrations of liquid from a natural gas pipeline, comprising the steps of:
 (a) locating a concentration of liquid in the pipeline;
 (b) installing a valve means on said pipeline above the concentration of liquid;
 (c) opening said valve means;
 (d) creating an opening in said pipeline which communicates with the interior of said valve means;
 (e) closing said valve means;
 (f) mounting a siphon pipe means on said valve means;
 (g) opening said valve means;
 (h) lowering the siphon pipe means through said valve means into the interior of said pipeline; and
 (i) utilizing the pressure within the pipeline to force the liquid upwardly through said siphon pipe means to a receiving area remote from said siphon pipe means.

7. The method of claim 6 including the further steps of:
 (a) raising the siphon pipe means upwardly above said valve means;
 (b) closing said valve means; and
 (c) removing said siphon pipe means from said valve means.

* * * * *